United States Patent [19]

Hartman

[11] Patent Number: 4,869,574
[45] Date of Patent: Sep. 26, 1989

[54] HYBRID OPTICAL CORRELATOR

[75] Inventor: Richard L. Hartman, Huntsville, Ala.

[73] Assignee: The United States of America as represented by the Secretary of the Army, Washington, D.C.

[21] Appl. No.: 204,153

[22] Filed: May 13, 1988

[51] Int. Cl.$^4$ .................... G02B 27/42; G06G 9/00
[52] U.S. Cl. .................... 350/162.13; 364/822
[58] Field of Search .................. 350/162.13; 364/822; 382/31

[56] References Cited

U.S. PATENT DOCUMENTS

| | | | |
|---|---|---|---|
| 3,689,772 | 9/1972 | George et al. | 250/211 |
| 4,715,683 | 12/1987 | Gregory et al. | 350/331 |
| 4,809,340 | 2/1989 | Mersereau | 350/162.13 |

OTHER PUBLICATIONS

"Hybrid optical-digital pattern recognition", Merkle et al, *Applied Optics*, vol. 23, #10, 15 May 1984.
"Automatic Pattern Recognition", by Nicholas George 1984, cover sheet and p. 35.
"Signal Detection By Complex Spatial Filtering", by A. Vander Lugt, IEEE Apr. 1964, pp. 139–145.

*Primary Examiner*—Bruce Y. Arnold
*Assistant Examiner*—J. P. Ryan
*Attorney, Agent, or Firm*—James T. Deaton; Freddie M. Bush

[57] ABSTRACT

A hybrid optical correlator which uses a Fourier plane detector to cause adjustment of an image of an object in scale and orientation so that a matched filter can provide a correlation of the object independent of scale and orientation.

6 Claims, 1 Drawing Sheet

HYBRID OPTICAL CORRELATOR

DEDICATORY CLAUSE

The invention described herein may be manufactured, used, or licensed by or for the Government for governmental purposes without the payment to me of any royalties thereon.

BACKGROUND OF THE INVENTION

In the past, a technique of image correlation by means of a lens has been used in which a two-dimensional Fourier transform of the image of an object is used to illuminate a hologram of the Fourier transform of a reference, and retransforming the result with another lens to get the correlation between the object and the reference is taught by A. Vander Lugt and this device is known as an optical matched filter. This technique is probably the mathematical optimum way of comparing an object to a reference. It has the special property of spatial invariance, and correlation occurs regardless of where the object is in the field of view. The location of the spot of light in the correlation plane describes the location of the object. This technique is robust against many forms of object clutter and provides multiple independent correlation spots if there are multiple images in the field of view. This matched filter technique has the disadvantage that it does not compensate for changes of scale or rotation of the object. Typically, a ten percent change of these parameters is enough to destroy the correlation. Another technique, known as Fourier plane detection, is taught by Nicholas George. The image of the object is Fourier transformed as above, but a detector array, rather than a holographic matched filter, is placed in the Fourier plane. George teaches a specially shaped detector, composed of annular ring elements in one half of the detector plane, and wedge elements in the other half. This detector is illustrated in FIG. 1 of the drawing and is disclosed in U.S. Pat. No. 3,689,772, which issued on Sept. 5, 1972. This detector is especially suited to Fourier plane detection, as the center symmetry means that the same element of information will fall on a ring or on a wedge structure of the detector. The ring structure then indicates the spatial frequency of a feature of information and the wedge structure indicates the angular direction of that feature. The ring, wedge information is placed into a digital computer, and any of a variety of algorithms are used to attempt to classify (recognize) the object being detected.

This Fourier plane detection technique has the disadvantage that it does not determine object location. It determines if a desired object is in the field of view, but cannot determine where it is in the field of view. It has the disadvantage that multiple images in the field of view will not necessarily result in multiple determinations. It also has the disadvantage that unwanted information in the field of view such as cutter is superimposed on the desired information so that the system is not highly robust to clutter.

Accordingly, it is an object of this invention to provide a hybrid optical correlator which uses a Fourier plane detector to adjust the image of an object so that a matched filter can provide a correlation, independent of scale and orientation of the object.

Another object of this invention is to provide a hybrid optical correlator which is a hybrid of the matched filter technique and the Fourier plane detection technique.

Another object of this invention is to provide a hybrid optical correlator which takes advantage of the strengths of both a matched filter correlation technique and the Fourier plane detection technique and uses these strengths to counterbalance the weaknesses of each of the other techniques.

Other objects and advantages of this invention will be obvious to those skilled in this art.

SUMMARY OF THE INVENTION

In accordance with this invention, a hybrid optical correlator is provided which uses the benefit of a Fourier plane detector to adjust the image of an object so that a optical matched filter can provide a correlation independent of scale and orientation of the object. This is accomplished by utilizing the matched filter technique and the Fourier plane detection technique and taking the advantages and strengths of each and utilizing the strengths of each to counterbalance the weakness of the other to provide the desired optical correlation independent of scale and orientation of the object.

DESCRIPTION OF THE PREFERRED EMBODIMENT

Figure 1:
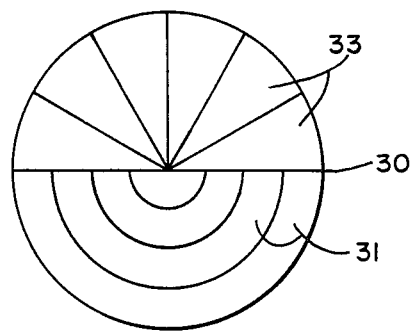
FIG. 1 is a diagram of a Fourier plane detector utilized in this invention.
Figure 2:
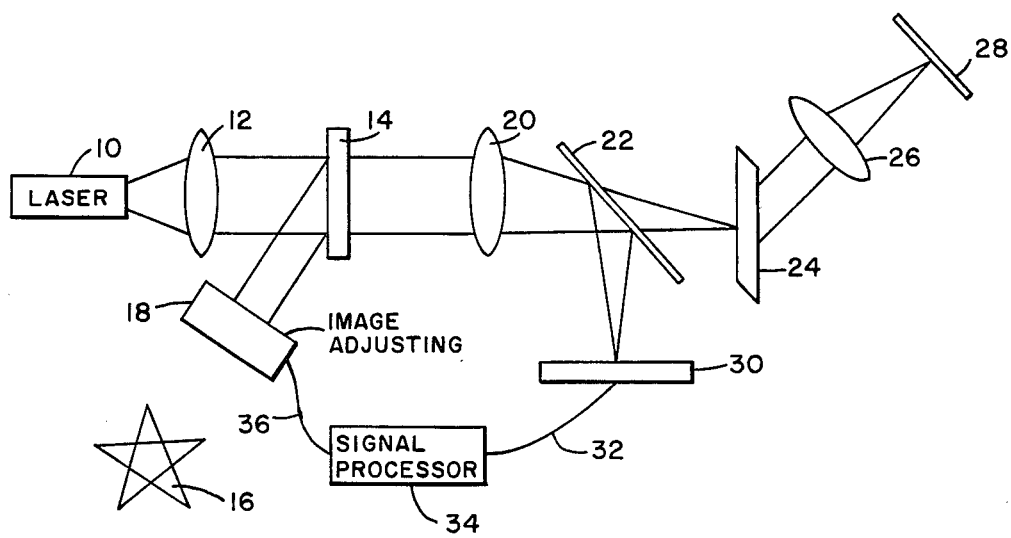
FIG. 2 is a schematic illustration of a hybrid optical correlator in accordance with this invention.

Referring now to the drawing, the hybrid optical correlator includes a laser 10 which illuminates lens 12 and the output from lens 12 falls on object modulator 14. Light from object 16 is transmitted through image adjusting subsystem 18 and onto object modulator 14. The output of the object from object modulator 14 in laser light is Fourier transformed by lens 20 and then a portion of the output from lens 20 is transmitted through beamsplitter 22 onto holographic matched filter 24. Lens 26 is used to retransform diffracted light from matched filter 24 and project it onto correlation plane 28 which is usually a video camera. The above description is the same as that for a Vander Lugt correlator except for the image adjusting subsystem 18 set forth above. In the above description, diffracted light from holographic matched filter 24 will not result unless a correlation is made. A portion of the transformed light from lens 20 is also deflected by beamsplitter 22 and falls on detector 30 which is a Fourier plane detector of the type taught by Nicholas George in U.S. Pat. No.: 3,689,772 which issued on Sept. 5, 1972. As illustrated, Fourier plane detector 30 has a multiplicity of wedge detectors 33 and a multiplicity of concentric annular detectors 31 that are utilized to determine the size and orientation of the object being displayed on the modulator. The output of Fourier plane detector 30 is connected by cable 32 to signal processor 34 such as a small digital computer. The outputs provided by signal processor 34 from the outputs of detector 30 are then used through cable 36 to drive image adjusting subsystem 18 to adjust the size and orientation of the image being transmitted from image adjusting subsystem 18 to object modulator 14. Image adjusting subsystem 18 can consist of image rotators such as dove prisms or mirrors or image scaling optics such as zoom lenses that are used to adjust the size of the object image as well as the orientation of the object image. If desired, image adjusting subsystem 18 can consist of electronics to rotate or change scale on the image such as by being on a cathode ray tube, if video imagery is used as the input. It is also understood that the output from signal processor 34 can be used to adjust other means in the system to adjust the size and the orientation of the object to make it coincide with that on holographic matched filter 24.

In operation, when the object and the reference are similar rectangles but not necessarily to the same scale or orientation, there will be no output from matched filter 24 correlator. However, Fourier plane detector 30 will have signals in a set of rings 31 associated with the size of the rectangle and signals in a set of wedges 33 associated with the orientation of the rectangle. The signals produced from rings 31 are used to send signals to signal processor 34 that produces signals for driving image adjusting subsystem 18 to adjust the size of the object and signals from wedges 33 are used to drive image adjusting subsystem 18 through signal processor 34 to adjust orientation of the object to the predetermined angle correct for matched filter 24. With image adjusting subsystem 18 adjusted to the correct position, the object and reference are in an identical position so that matched filter 24 will diffract and the diffracted light will be retransformed by lens 26 and fall onto correlation plane 28 to produce a correlator spot on correlation plane 28. The location of the correlation spot will disclose the location of the object rectangle in the field of view. That is, the location of the correlator spot on the screen of the video camera will enable one to visually see the location of the object rectangle in the field of view.

Consider now a more detailed object such as an automobile. If the object and the reference are identical, there will be a strong correlation after image adjusting subsystem 18 is aligned. However, if the object automobile is different such as sedan rather than a station wagon, matched filter 24 is a powerful enough discriminator that it will correlate only when the object/reference pair are matched.

There is a possibility of ambiguity. Fourier plane detector 30 does not directly associate the short vs. longside with the orientations of the two sides. Two rectangles rotated 90 degrees apart have the same first order binary Fourier plane signal. It is possible to do a more sophisticated analysis of the Fourier plane signal to remove the ambiguity, but it may not be necessary. If the object doesn't match the target, it makes no difference. If the object does match, then the system can try both rotational positions. Dividing the rings into two sections is enough to remove the ambiguity for this class of objects.

I claim:

1. A hybrid optical correlator comprising object modulation means for producing an image of an object in collimated light, Fourier transform means mounted for receiving the image of said object in collimated light and transmitting an output to a holographic matched filter, splitter means between said Fourier transform means and said holographic matched filter for splitting off a portion of said output and onto detector means for detecting the transmitted size and orientation of the image, and means which responds to outputs from said detector means and adjusts the orientation and size of the image of the object being projected onto said object modulator means to cause said matched filter to correlate.

2. A hybrid optical correlator as set forth in claim 1, wherein said means which responds to said outputs includes a signal processor and an image adjusting subsystem, said signal processor processing outputs and producing signals which are utilized in said image adjusting subsystem for adjusting the size and orientation of the image.

3. A hybrid optical correlator as set forth in claim 2, wherein said detector means includes triangular detectors and semicircular ring detectors for detecting the size and orientation of the image.

4. A hybrid optical correlator as set forth in claim 3, wherein said object modulator is illuminated by laser light.

5. A hybrid optical correlator as set forth in claim 4, wherein a lens is mounted for retransforming diffracted light from said matched filter and for projecting said retransformed diffracted light onto a correlation plane.

6. A hybrid optical correlator comprising a laser for producing a laser beam, a lens for collimating the light from said laser, and an object modulator for receiving the collimated light from the lens and for receiving the image of an object from an imaging system that directs the image of the object to the object modulator, a Fourier transform lens mounted for receiving from the object modulator the image in laser light and for transmitting its output to a holographic matched filter, a beamsplitter mounted between said Fourier transform lens and said matched filter, a lens mounted for retransforming diffracted light from said matched filter and causing the retransformed light to fall onto a correlation plane, said beamsplitter adapted for splitting off a portion of the light from said Fourier transform lens and for projecting the split off light to a detector that has a multiplicity of wedges and a multiplicity of semicircular rings for detecting the orientation and size of the image of an object, said detector having outputs that are connected to a signal processor for processing signals produced at outputs of said detector, said signal processor producing signals from the outputs of said detector for providing adjusting signals, and said adjusting signals from said signal processor being connected to an image adjusting subsystem which transmits the image of the object to said object modulator, said image adjusting subsystem including means for adjusting the scale of the image of an object and the orientation of the image of an object to adjust the image to a predetermined size and orientation which is correct relative to said matched filter to cause said matched filter to correlate.

* * * * *